US006581208B1

(12) United States Patent
Inaguma (10) Patent No.: US 6,581,208 B1
(45) Date of Patent: Jun. 17, 2003

(54) UP-CONVERTER AND DOWN-CONVERTER FOR IN-BUILDING CATV SYSTEM

(75) Inventor: Mitsuhiko Inaguma, Nisshin (JP)

(73) Assignee: Masprodenkoh Kabushikikaisha, Nisshin (JP)

(*) Notice: Subject to any disclaimer, the term of this patent is extended or adjusted under 35 U.S.C. 154(b) by 0 days.

(21) Appl. No.: 09/507,713

(22) Filed: Feb. 18, 2000

(30) Foreign Application Priority Data

Feb. 19, 1999 (JP) ............................................. 11-041718
Jul. 8, 1999 (JP) ............................................. 11-194441
Jul. 16, 1999 (JP) ............................................. 11-203276

(51) Int. Cl.⁷ ............................... H04N 7/16; H04N 7/18
(52) U.S. Cl. ........................... 725/149; 725/78; 725/128
(58) Field of Search .......................... 725/78, 118, 127, 725/148, 149, 111, 128, 80, 74, 126, 71

(56) References Cited

U.S. PATENT DOCUMENTS

| 3,778,716 A | * | 12/1973 | Stokes | 725/73 |
| RE31,639 E | * | 7/1984 | Nicholson | 725/105 |
| 4,494,138 A | * | 1/1985 | Shimp | 725/121 |
| 4,569,084 A | * | 2/1986 | Takahama | 455/131 |
| 5,073,930 A | * | 12/1991 | Green et al. | 725/125 |
| 5,230,086 A | * | 7/1993 | Saul | 455/502 |
| 5,437,052 A | * | 7/1995 | Hemmie et al. | 725/124 |
| 5,548,811 A | * | 8/1996 | Kumagai et al. | 455/192.2 |
| 5,557,319 A | * | 9/1996 | Gurusami et al. | 725/126 |
| 5,835,128 A | * | 11/1998 | Macdonald et al. | 725/81 |
| 6,094,211 A | * | 7/2000 | Baran et al. | 725/125 |
| 6,151,559 A | * | 11/2000 | Williams | 725/74 |
| 6,160,571 A | * | 12/2000 | Wang | 725/127 |
| 6,212,397 B1 | * | 4/2001 | Langston et al. | 455/500 |

FOREIGN PATENT DOCUMENTS

| JP | 10174084 | 6/1998 |
| JP | 11004426 | 1/1999 |
| JP | 11220716 | 8/1999 |
| JP | 11355738 | 12/1999 |

* cited by examiner

Primary Examiner—John Miller
Assistant Examiner—Scott Beliveau
(74) Attorney, Agent, or Firm—Davis & Bujold, P.L.L.C.

(57) ABSTRACT

An in-building CATV system having a down-converter for converting the in-building upward signal to the signal for a bi-directional CATV system provided with a high-pass filter disposed between an internal terminal and a converter for eliminating input of the downward signal passed through the downward signal path and selectively passing the in-building upward signal, a low-pass filter disposed between the converter and an external terminal for eliminating the downward signal inputted from the external terminal and selectively passing the upward signal outputted from the converter, a high-pass filter disposed between the external terminal and the downward signal path for eliminating input of the upward signal outputted from the converter and selectively passing the downward signal inputted from the external terminal and a low-pass filter disposed between the downward signal path and the internal-terminal for eliminating the in-building upward signal inputted from the internal terminal and selectively passing the downward signal.

3 Claims, 6 Drawing Sheets

UP-CONVERTER AND DOWN-CONVERTER FOR IN-BUILDING CATV SYSTEM

BACKGROUND OF THE INVENTION (i) Field of the Invention

The present invention relates to an up-converter used for frequency-converting an upward signal outputted from a terminal unit to an in-building upward signal in an in-building CATV system in which an external bi-directional CATV system transmission path and an in-building terminal are interconnected to transmit upward and downward signals in both directions. The present invention further relates to a down-converter for converting the frequency of the in-building upward signal transmitted from the side of the terminal unit via the up-converter to a transmission frequency in the bi-directional CATV system to transmit the signal onto the transmission path of the bi-directional CATV system.

(ii) Description of the Related Art

In a conventionally known in-building CATV system connected to a lead-in wire from an external bi-directional CATV system, a downward signal transmitted from a central apparatus of the bi-directional CATV system via the lead-in wire is transmitted to a terminal in the building via a transmission line in the building. Additionally, an upward signal inputted from the terminal unit is transmitted to the lead-in wire, and outputted toward the central apparatus of the bi-directional CATV system via the lead-in wire.

Moreover, in the in-building CATV system, noises generated in the building are superposed to the in-building transmission line via the terminal on the subscriber side, flow together, and are outputted to the external bi-directional CATV system together with the upward signal.

To reduce the confluent noises flowing out to the external bi-directional CATV system, in a heretofore proposed method, an up-converter is used to once frequency-convert the upward signal generated in the terminal unit such as a cable modem on the subscriber side, that is, the signal with a frequency band, for example, of 5 to 42 MHz which can be transmitted by the bi-directional CATV system to an upward signal (hereinafter referred to as the in-building upward signal) with a UHF band (e.g., 913 to 950 MHz) which is higher than the original frequency and which does not overlap and is much higher than the transmission frequency (e.g., 54 to 860 MHz) of the downward signal. The in-building upward signal is transmitted to the lead-in wire, and the down-converter is used to convert the frequency of the in-building upward signal to the original frequency, that is, the transmission frequency of the upward signal in the bi-directional CATV system, immediately before the upward signal is outputted to the lead-in wire via the in-building transmission line.

Figure 5A:
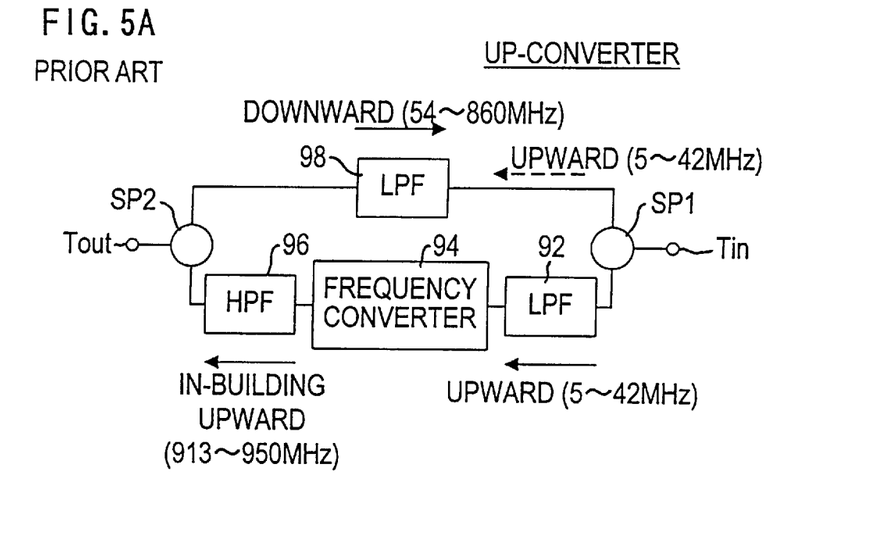
FIGS. 5A and 5B are explanatory views showing the constitution and problem of a conventional up-converter and bi-directional amplifier.

The up-converter for use in the conventional in-building CATV system is usually constituted as shown in FIG. 5A.

Specifically, first, the up-converter needs not only to frequency-convert the upward signal outputted from the terminal unit to the in-building upward signal, but also to output the downward signal transmitted via the transmission line of the in-building CATV system toward the terminal unit. For this purpose, in the conventional up-converter, in order to form two upward and downward paths in the up-converter, the up-converter is provided with distribution circuits SP1 and SP2, and a first terminal Tin connected to the terminal unit on the subscriber side and a second terminal Tout connected to the in-building CATV system are connected to the distribution circuits SP1 and SP2, respectively.

Moreover, the upward signal inputted to the first terminal Tin from the terminal unit is inputted to a frequency converter 94 via a low-pass filter (hereinafter referred to as LPF) 92 which is connected to one distribution terminal of the distribution circuit SP1. Furthermore, the in-building upward signal outputted from the frequency converter 94 is inputted to one distribution terminal of the distribution circuit SP2 connected to the second terminal Tout via a high-pass filter (hereinafter referred to as HPF) 96, and then outputted to the transmission line of the in-building CATV system from the second terminal Tout via the distribution circuit SP2.

Furthermore, the downward signal transmitted to the second terminal Tout is transmitted from the other distribution terminal of the distribution circuit SP2, via a downward signal transmitting path provided with an LPF 98, to the other distribution terminal of the distribution circuit SP1. Then, the downward signal is outputted to the terminal unit on the subscriber side from the first terminal Tin via the distribution circuit SP1.

Additionally, the LPF 92 disposed in the previous stage of the frequency converter 94 selectively passes the upward signal from the side of the terminal unit, the HPF 96 disposed in the subsequent stage of the frequency converter 94 selectively passes the in-building upward signal outputted from the frequency converter 94, and the LPF 98 disposed on the downward signal path selectively passes the downward signal.

However, in the conventional up-converter constituted as described above, since the upward signal path provided with the frequency converter 94 and the downward signal path are separated using the distribution circuits SP1, SP2, there is a problem that signal losses are increased when the signals pass through the distribution circuits SP1, SP2.

Figure 5B:
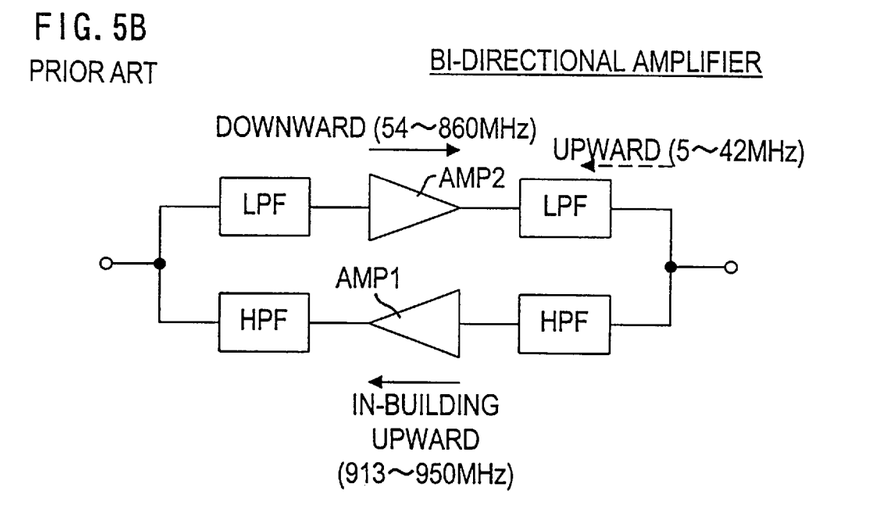

Moreover, the upward signal inputted to the first terminal Tin from the terminal unit is not only transmitted to the frequency converter 94 through the LPF 92, but also outputted onto the transmission line of the in-building CATV system from the second terminal Tout through the LPF 98 which allows to pass low frequency signals. This adversely affects the operation of a bi-directional amplifier disposed on the transmission line of the in-building CATV system as shown in FIG. 5B.

Specifically, the downward signal and the in-building upward signal are to be transmitted by the in-building CATV system provided with the down-converter. Even when the upward signal different in frequency from these signals is transmitted to the transmission line of the in-building CATV system from the up-converter, no problem basically arises. However, when the bi-directional amplifier is disposed on the transmission line of the in-building CATV system, as shown in FIG. 5B, the in-building upward signal and the downward signal are amplified by amplification circuits AMP 1, AMP 2 provided with HPF, LPF for signal selection both in previous and subsequent stages, respectively. In this constitution, the upward signal outputted from the up-converter is inputted to the output side of the amplification circuit AMP 2 for amplifying the downward signal. When the upward signal is inputted in this manner, the upward signal turns to the input side of the amplification circuit AMP 2 via the feedback circuit of the amplification circuit AMP 2, and the amplification circuit AMP 2 oscillates.

Figure 6A:
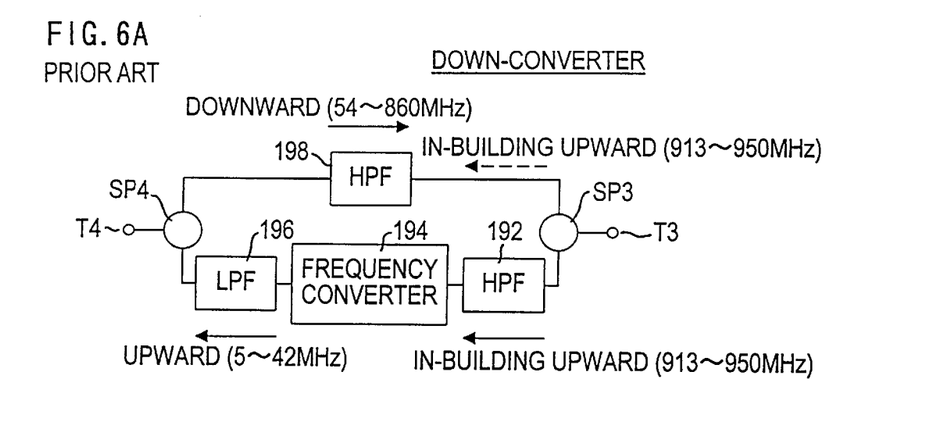
FIGS. 6A and 6B are explanatory views showing the constitution and problem of a conventional down-converter and bi-directional amplifier.

Furthermore, the down-converter for use in the conventional in-building CATV system is usually constituted as shown in FIG. 6A.

Specifically, first, the down-converter needs not only to frequency-convert the in-building upward signal transmitted from the terminal side via the in-building transmission line to the upward signal with a lower frequency, but also to transmit the downward signal inputted from the bi-directional CATV system via the lead-in wire onto the in-building transmission line. For this purpose, in the conventional down-converter, in order to form two upward and downward paths in the down-converter, the down-converter is provided with distribution circuits SP3 and SP4, and an external connection terminal T4 connected to the lead-in wire from the bi-directional CATV system and an internal connection terminal T3 connected to the in-building transmission line are connected to the distribution circuits SP4 and SP3, respectively.

Moreover, the in-building upward signal inputted to the internal connection terminal T3 is outputted to a frequency converter 194 via an HPF 192 which is connected to one distribution terminal of the distribution circuit SP3. Furthermore, the frequency-converted upward signal outputted from the frequency converter 194 is outputted to one distribution terminal of the distribution circuit SP4 connected to the external connection terminal T4 via an LPF 196, and then outputted to the transmission line of the external bi-directional CATV system from the external connection terminal T4 via the distribution circuit SP4.

Furthermore, the downward signal inputted to the external connection terminal T4 is transmitted from the other distribution terminal of the distribution circuit SP4, via a downward signal transmitting path provided with an HPF 198, to the other distribution terminal of the distribution circuit SP3. Then, the downward signal is outputted onto the in-building transmission line from the internal connection terminal T3 via the distribution circuit SP3.

Additionally, the HPF 192 disposed in the previous stage of the frequency converter 194 selectively passes the in-building upward signal, the LPF 196 disposed in the subsequent stage of the frequency converter 194 selectively passes the frequency-converted upward signal outputted from the frequency converter 194, and the HPF 198 disposed on the downward signal path selectively passes the downward signal.

However, in the conventional down-converter constituted as described above, the upward signal path provided with the frequency converter 194 and the downward signal path are separated using the distribution circuits SP3, SP4. Therefore, a problem arises that signal losses are increased when the signals pass through the distribution circuits SP3, SP4.

Figure 6B:
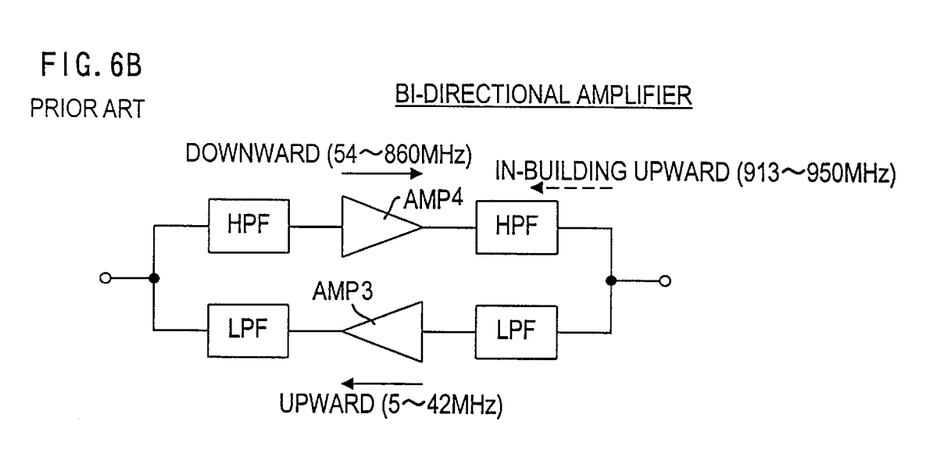

Moreover, the in-building upward signal inputted to the internal connection terminal T3 is not only inputted to the frequency converter 194 through the HPF 192, but also outputted onto the transmission line of the external bi-directional CATV system from the external connection terminal T4 through the HPF 198. This adversely affects the operation of a bi-directional amplifier disposed on the transmission line of the external bi-directional CATV system as shown in FIG. 6B.

Specifically, the downward signal and the upward signal with a lower frequency than that of the downward signal are to be transmitted in the external bi-directional CATV system. Even when the in-building upward signal different in frequency from these signals is transmitted onto the transmission line of the external bi-directional CATV system from the down-converter, no problem basically arises.

However, the bi-directional amplifier for amplifying the upward and downward signals flowing through the transmission path is disposed on the transmission line of the bi-directional CATV system. As shown in FIG. 6B, the upward and downward signals are amplified by amplification circuits AMP 3, AMP 4 provided with LPF, HPF for signal selection in the previous and subsequent stages, respectively. In this constitution of the amplifier, the in-building upward signal passed through the down-converter is inputted to the output side of the amplification circuit AMP 4 for amplifying the downward signal. When the in-building upward signal is inputted in this manner, the in-building upward signal turns to the input side of the amplification circuit AMP 4 via the feedback circuit of the amplification circuit AMP 4, and the amplification circuit AMP 4 oscillates.

SUMMARY OF THE INVENTION

Wherefore, an object of the present invention is to provide an up-converter for use in frequency-converting an upward signal from a terminal unit to an in-building upward signal to an in-building CATV system for transmitting signals in two opposite directions between an external bi-directional CATV system and the terminal unit in a building, which reduces signal losses and which exerts no influence on other apparatuses such as a bi-directional amplifier.

Another object of the present invention is to provide a down-converter in an in-building CATV system for transmitting signals in two opposite directions between the external bi-directional CATV system and a terminal unit in a building and for use in frequency-converting an in-building upward signal transmitted from a terminal side via an in-building transmission line to an upward signal for an external bi-directional CATV system, which reduces signal losses and which exerts no influence on the operation of a transmission apparatus on the side of the bi-directional CATV system.

To attain this and other objects, according to one aspect of the present invention, there is provided an up-converter for an in-building CATV system, which frequency-converts an upward signal inputted to a first terminal from the side of a terminal unit to an in-building upward signal using a frequency converter, subsequently outputs the in-building upward signal onto a transmission line of the in-building CATV system from a second terminal, transmits a downward signal inputted from the second terminal to the first terminal via an internal downward signal path, and outputs the downward signal toward the terminal unit from the first terminal, in which:

(1) a low-pass filter is disposed between the first terminal and the frequency converter to cut off the input of the downward signal passed through the downward signal path, and to selectively pass the upward signal from the side of the terminal unit;

(2) a high-pass filter is disposed between the frequency converter and the second terminal to cut off the downward signal inputted from the second terminal, and to selectively pass the in-building upward signal outputted from the frequency converter;

(3) the low-pass filter is disposed between the second terminal and the downward signal path to cut off the input of the in-building upward signal outputted from the frequency converter, and to selectively pass the downward signal inputted from the second terminal; and (4) the high-pass filter is disposed between the downward signal path and the first terminal to cut off the upward signal inputted from the first terminal, and to selectively pass the downward signal.

As a result, only the downward signal is outputted on the side of the terminal unit from the up-converter of the present invention, and only the in-building upward signal frequency-converted in the frequency converter is outputted onto the transmission line of the in-building CATV system. Since the non-converted upward signal outputted from the terminal unit is not transmitted to the transmission line of the in-building CATV system, the operation of transmission apparatuses such as the bi-directional amplifier disposed on the transmission line can be prevented from being adversely affected.

Moreover, in the present invention, the upward and downward signal paths in the up-converter are separated by the four types of filters. Different from the conventional apparatus shown in FIG. 5A, no distribution circuit for separating the signal path is used. Therefore, the signal losses in the up-converter can be reduced.

Here, as is known, in the frequency converter, by mixing a reference signal with a predetermined frequency and the upward signal, the upward signal is frequency-converted to an upward signal with a frequency which is higher than that of the upward signal, more especially, the downward signal. Moreover, as the reference signal for use in the frequency conversion by the frequency converter, the reference signal generated in an oscillation circuit incorporated in the up-converter may be used.

In this case, however, the reference signal on the side of the up-converter does not correspond to the reference signal on the side of the down-converter which frequency-converts the in-building upward signal to the upward signal. On the side of the down-converter, the in-building upward signal cannot be converted to the upward signal for the external bi-directional CATV system.

To solve such problem, according to the present invention, the frequency converter may be constituted to use the reference signal with the predetermined frequency superposed to the downward signal transmitted from the in-building CATV system, and to frequency-convert the upward signal to the in-building upward signal. In this manner, the reference signal on the side of the up-converter corresponds to the reference signal on the side of the downward signal. Moreover, the in-building upward signal can accurately be converted to the upward signal for the external bi-directional CATV system in the down-converter.

Additionally, as the above-described reference signal, a pilot signal for use in level adjustment of the downward signal in the external bi-directional CATV system, or a reference signal generated and outputted to the in-building transmission line by the down-converter may be used.

On the other hand, when the frequency converter is constituted to utilize the reference signal with the predetermined frequency superposed to the downward signal transmitted from the in-building CATV system, and to frequency-convert the upward signal to the in-building upward signal, the reference signal needs to be inputted to the frequency converter in the up-converter.

For this purpose, a part of the downward signal inputted to the second terminal from the in-building transmission line may be branched to the frequency converter. However, when such a branch device is disposed on the signal path leading to each filter from the second terminal, not only the downward signal but also the in-building upward signal pass through the branch device. The signal loss of the in-building upward signal occurs in the branch device.

Therefore, according to the present invention, this branch device may be disposed on the downward signal path to which the downward signal is inputted from the second terminal via the low-pass filter, so that a part of the downward signal inputted via the low-pass filter may be inputted to the frequency converter. Specifically, the reference signal superposed to the downward signal may be inputted to the frequency converter without influencing the in-building upward signal.

According to another aspect of the present invention, there is provided a down-converter for an in-building CATV system, which outputs a downward signal inputted to an external connection terminal from a lead-in wire onto a transmission line in a building from an internal connection terminal via a downward signal path, frequency-converts an in-building upward signal inputted to an internal connection terminal from the transmission line to an upward signal for an external bi-directional CATV system using a frequency converter, and subsequently outputs the upward signal onto a transmission path of the external bi-directional system from an external connection terminal via the lead-in wire, in which:

(1) a high-pass filter is disposed between the internal connection terminal and the frequency converter to cut off the input of the downward signal passed through the downward signal path, and to selectively pass the in-building upward signal;

(2) a low-pass filter is disposed between the frequency converter and the external connection terminal to cut off the downward signal inputted from the external connection terminal, and to selectively pass the upward signal outputted from the frequency converter;

(3) the high-pass filter is disposed between the external connection terminal and the downward signal path to cut off the input of the upward signal outputted from the frequency converter, and to selectively pass the downward signal inputted from the external connection terminal; and (4) the low-pass filter is disposed between the downward signal path and the internal connection terminal to cut off the in-building upward signal inputted from the internal connection terminal, and to selectively pass the downward signal.

As a result, only the downward signal is outputted to the transmission line in the building from the down-converter of the present invention, and only the upward signal frequency-converted in the frequency converter is outputted onto the transmission line of the external bi-directional CATV system. Moreover, since the in-building upward signal is not transmitted to the transmission path of the external bi-directional CATV system, the operation of transmission apparatuses such as the bi-directional amplifier disposed on the transmission path can be prevented from being adversely affected.

Moreover, in the present invention, the upward and downward signal paths in the down-converter are separated by the four types of filters. Different from the conventional apparatus shown in FIG. 6A, no distribution circuit for separating the signal path is used. Therefore, the signal losses in the down-converter can be reduced.

BRIEF DESCRIPTION OF THE DRAWINGS

A preferred embodiment of the present invention will now be described with reference to the drawings, in which.

DETAILED DESCRIPTION OF PREFERRED EMBODIMENTS

Figure 1:
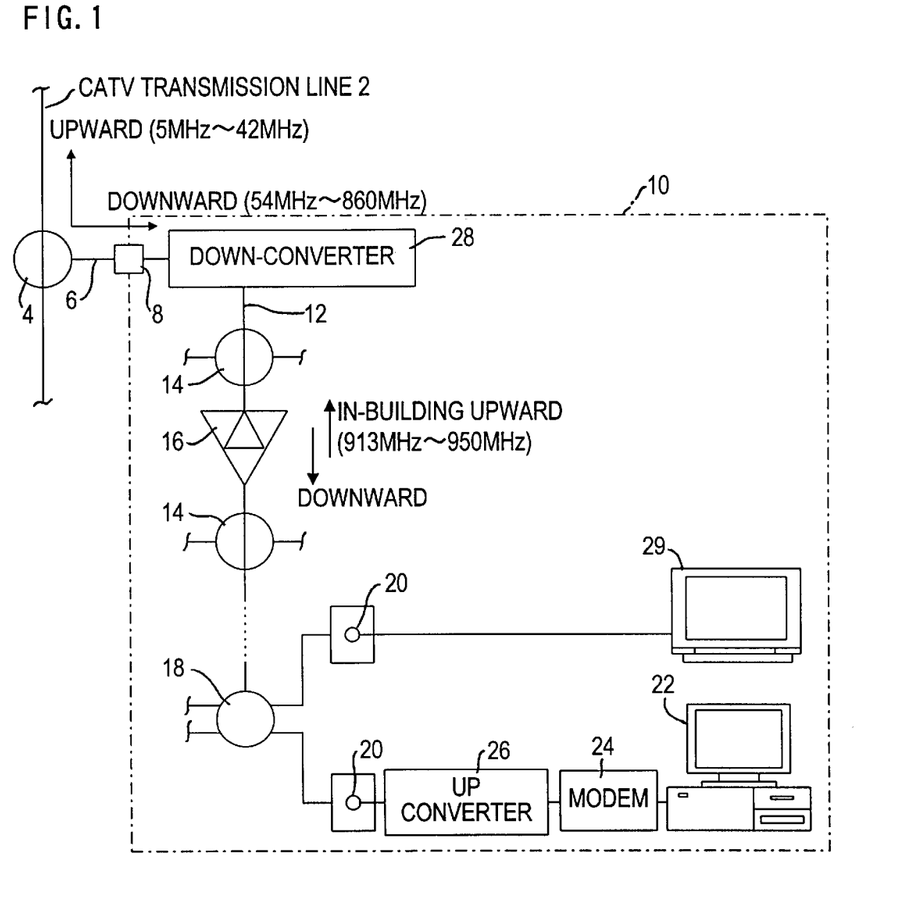
FIG. 1 is a schematic view showing the constitution of an in-building CATV system according to an embodiment of the present invention.

As shown in FIG. 1, in the in-building CATV system of the present embodiment, a lead-in wire 6 branched at directional coupler 4 from a CATV transmission line 2 of an external bi-directional CATV system is led into a building 10 such as a condominium and an apartment house via a protector 8. A downward signal of the bi-directional CATV system with a frequency of 54 MHz to 860 MHz inputted from the lead-in wire 6 is transmitted to a large number of terminals 20 in the building 10 via a transmission line 12 in the buidling 10, directional couplers 14, bi-directional amplifiers 16 and splitters 18 disposed on the transmission line 12. Additionally, an upward signal (in-building upward signal) inputted from the terminal 20 is transmitted to the CATV transmission line via the lead-in wire 6.

Moreover, in the in-building CATV system of the present embodiment, data for reserving a pay program, television shopping, and the like are generated in an information terminal 22 such as a personal computer and transmitted to a central apparatus of the external bi-directional CATV system. In this case, a cable modem 24 converts the data to an upward signal with a predetermined frequency band (5 to 42 MHz in the present embodiment) which can be transmitted in the external bi-directional CATV system. Furthermore, an up-converter 26 is used to frequency-convert this upward signal to an in-building upward signal with a predetermined frequency band (913 to 950 MHz in the present embodiment), and the in-building upward signal is inputted to the terminal 20.

For this purpose, a connection portion of the transmission line 12 of the in-building CATV system and the lead-in wire 6 from the external bi-directional CATV system is provided with a down-converter 28 for returning or frequency-converting the in-building upward signal transmitted from the terminal 20 via the transmission line 12 to the upward signal which can be used in the external bi-directional CATV system.

Additionally, in FIG. 1, the terminal 20 which is not connected to the up-converter 26 is connected to a television receiver 29 for receiving the downward signal transmitted via the transmission line 12 to demodulate/regenerate the signal.

Figure 2:
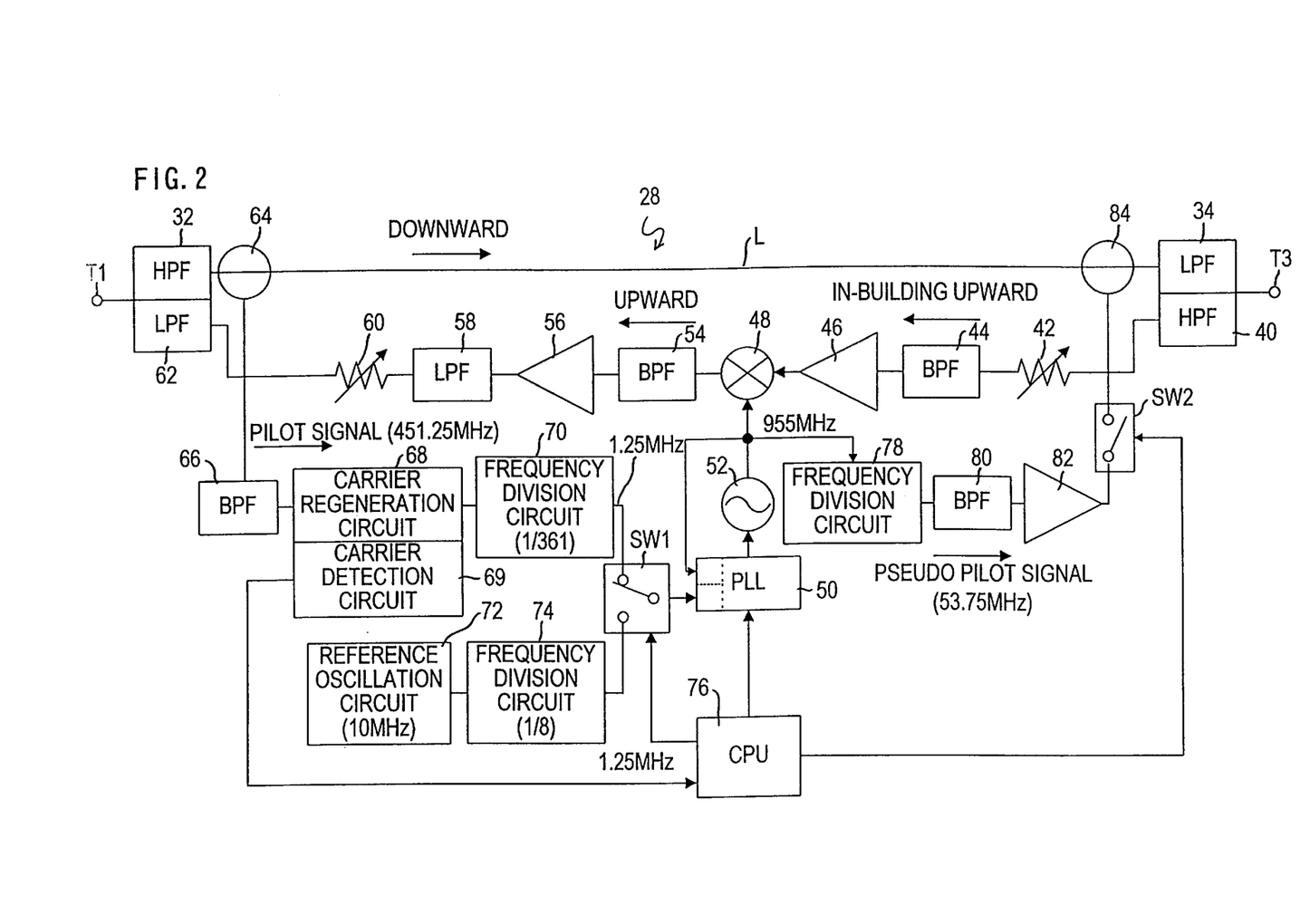
FIG. 2 is a block diagram showing the constitution of a down-converter.

Furthermore, the down-converter 28 is constituted as shown in FIG. 2.

As shown in FIG. 2, the down-converter 28 is provided with an external connection terminal T1 for connecting the lead-in wire from the external bi-directional CATV system, and an internal connection terminal T3 for connecting the transmission line 12 in the building 10. Moreover, the downward signal inputted to the external connection terminal T1 is taken into the down-converter 28 via an HPF 32 for blocking the upward signal, and outputted toward the internal connection terminal T3 via an LPF 34 for blocking the in-building upward signal. Specifically, the downward signal inputted to the external connection terminal T1 is taken into the down-converter 28 via the HPF 32 with a cutoff frequency, for example, of 54 MHz which cuts off the input of the frequency-converted upward signal, and passes the downward signal. Moreover, the taken downward signal is transmitted to the LPF 34 through an internal downward signal path L, and outputted toward the internal connection terminal T3 via the LPF 34. Additionally, the LPF 34 cuts off the in-building upward signal inputted from the internal connection terminal T3, and passes the downward signal, and its cutoff frequency is set, for example, to 860 MHz.

The downward signal passed through the LPF 34 can be transmitted to the transmission line 12 from the internal connection terminal T3.

Furthermore the in-building upward signal inputted to the internal connection terminal T3 from the terminal side is taken into the down-converter 28 via an HPF 40 for blocking the downward signal. Additionally, the HPF 40 prevents the downward signal passed through the downward signal path L from turning around, and selectively passes only the in-building upward signal, and its cutoff frequency is set, for example, to 913 MHz. Moreover, the in-building upward signal introduced via the HPF 40 is inputted to an amplification circuit 46 for amplifying the in-building upward signal through an attenuator 42 for attenuating the in-building upward signal, a band pass filter (hereinafter referred to as BPF) 44 for passing the in-building upward signal. After the signal is amplified in the amplification circuit 46 to provide a predetermined level determined by the attenuation amount of the attenuator 42 and the amplification ratio of the amplification circuit 46, the signal is inputted to a mixer 48 for frequency conversion.

The mixer 48 receives the signal from a local oscillation circuit 52. The oscillation frequency of the signal is controlled to be constant, for example, at 955 MHz in the present embodiment by a PLL circuit 50 described later. The mixer 48 also frequency-converts the in-building upward signal to the upward signal for the bi-directional CATV system. The frequency converted upward signal is transmitted to an LPF 62 for blocking the downward signal via a BPF 54 for passing the upward signal, an amplification circuit 56 for amplifying the upward signal, an LPF 58 for passing the upward signal, and an attenuator 60 for attenuating the upward signal, and outputted toward the lead-in line 6 from the LPF 62 via the external connection terminal T1. Additionally, the attenuator 60 adjusts the level of the upward signal outputted toward the lead-in wire 6 from the external connection terminal T1. Moreover, the LPF 62 cuts off the downward signal inputted to the external connection terminal T1, and passes the frequency-converted upward signal, and its cutoff frequency is set, for example, to 42 MHz.

Moreover, a directional coupler 64 for branching a part of the downward signal passed through the HPF 32 is disposed on the downward signal path L leading to the LPF 34 from the HPF 32. The downward signal branched by this directional coupler 64 is inputted to an BPF 66, which passes a pilot signal of 451.25 MHz for use in level adjustment of the downward signal in the bi-directional CATV system. Furthermore, the downward signal passed through the BPF 66, that is, the pilot signal is inputted to a carrier regeneration circuit 68 for regenerating a pilot signal carrier. The pilot signal carrier regenerated in the carrier regeneration circuit 68 is inputted to a frequency division circuit 70, which divides the frequency of the carrier to provide a 1/361 period and generates the reference signal of a predetermined frequency of 1.25 MHz in the present embodiment.

The down-converter 28 is also provided with a reference oscillation circuit 72 having an oscillation frequency of 10 MHz, and a frequency division circuit 74 for dividing the frequency of the output signal from the reference oscillation circuit 72 to provide a 1/8 period and generating the reference signal, which has the same frequency of 1.25 MHz in the present embodiment as that of the reference signal generated by the frequency division circuit 70. Moreover, the outputs (i.e., the reference signals) from these frequency division circuits 70, 74 are selectively inputted to the PLL circuit 50 via a switch SW1 for switching the reference signal.

The PLL circuit 50 takes in the reference signal inputted via the switch SW1 and the output from the local oscillation circuit 52 via their respective internal frequency division circuits, and controls the local oscillation circuit 52 based on the phase difference of the divided signals, so that the oscillation frequency of the local oscillation circuit 52 is controlled to provide a constant frequency of 955 MHz. The down-converter 28 is also provided with a microcomputer 76 (hereinafter referred to as CPU) to set the oscillation frequency of the local oscillation circuit 52 controlled by this PLL circuit 50, that is, the frequency division ratio of a frequency division circuit inside the PLL circuit 50.

Moreover, as to the carrier regeneration circuit 68, a carrier detection circuit 69 is provided for detecting the pilot signal carrier, and a detection signal indicating the presence/absence of the carrier (i.e., the pilot signal) outputted from the carrier detection circuit 69 is inputted to the CPU 76. Furthermore, the CPU 76 switches the switch SW1 based on this detection signal.

Furthermore, the down-converter 28 is provided with a frequency division circuit 78 for dividing the frequency of the output from the local oscillation circuit 52 and generating a pseudo pilot signal having a predetermined frequency of 53.75 MHz in the present embodiment, a BPF 80 for passing the pseudo pilot signal outputted from the frequency division circuit 78, and amplification circuit 82 for amplifying the pseudo pilot signal passed through the BPF 80 to provide a predetermined level, and a mixer 84 for mixing the pseudo pilot signal amplified in the amplification circuit 82 and the downward signal path leading to the LPF 34 from the HPF 32 to transmit an output toward the terminal side from the LPF 34. Additionally, disposed on a pseudo pilot signal path leading to the mixer 84 from the amplification circuit 82 is a switch SW2 for making on or off the path. Moreover, when it is determined that there is no pilot signal in the carrier detection circuit 69, the switch SW2 is controlled and placed in an on state by a drive signal from the CPU 76.

Figure 3:
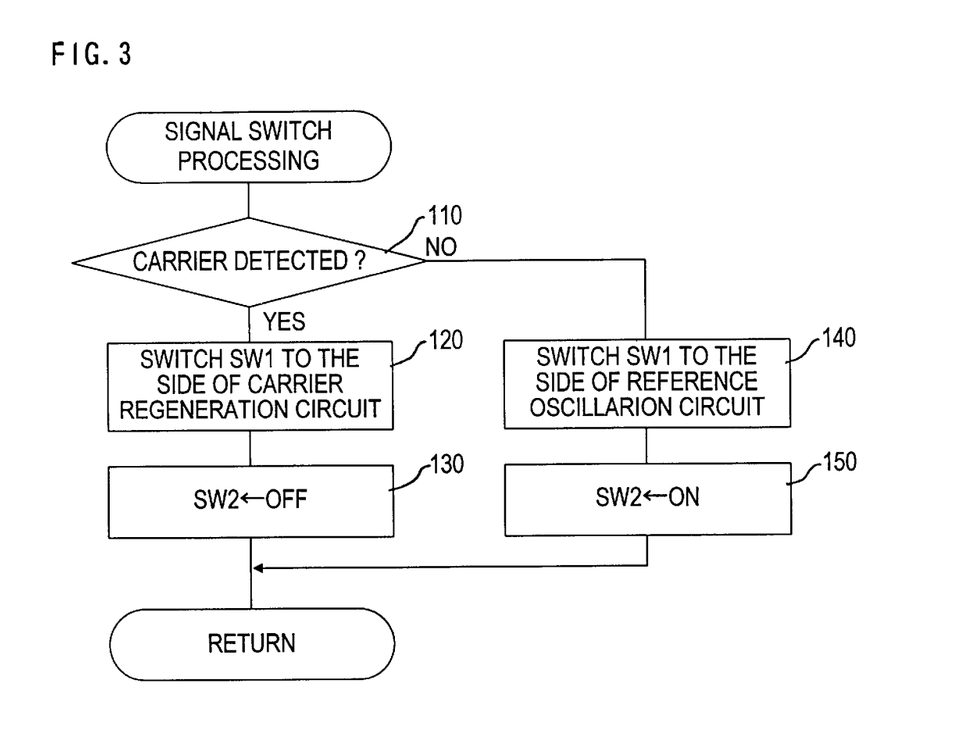
FIG. 3 is a flowchart showing a signal switch processing executed in the CPU of the down-converter.

FIG. 3 is a flowchart showing a signal switch processing which is executed by the CPU 76 to switch the switches SW1 and SW2 based on the detection signal from the carrier detection circuit 69.

This processing is repeatedly carried out every predetermined time in the CPU 76. When the processing is started, it is first determined in step 110 based on the detection signal from the carrier detection circuit 69 whether or not the pilot signal carrier is detected by the carrier detection circuit 69.

Subsequently, when the pilot signal carrier is detected, in other words, when the pilot signal is inputted from the external bi-directional CATV system via the lead-in wire 6, in step 120 the switch SW1 is switched to the side of the carrier generation circuit 68. The reference signal generated based on the pilot signal in the frequency division circuit 70 is inputted to the PLL circuit 50, and in step 130 the switch SW2 is turned off to inhibit the output of the pseudo pilot signal to the terminal side, thereby ending this processing.

On the other hand, when the pilot signal carrier is not detected, in other words, when no pilot signal is inputted from the external bi-directional CATV system via the lead-in wire 6, the switch SW1 is switched to the side of the reference oscillation circuit 72 in step 140, so that the reference signal generated based on the output from the reference oscillation circuit 72 in the frequency division circuit 74 is inputted to the PLL circuit 50. Subsequently, in step 150, the switch SW2 is turned on to output the pseudo pilot signal to the terminal side, thereby ending the processing.

As described above, in the down-converter 28 of the present embodiment, when the pilot signal is included in the downward signal inputted from the external bi-directional CATV system via the lead-in wire 6, the reference signal generated from this pilot signal is used to frequency-convert the in-building upward signal to the upward signal for the external bi-directional CATV system. Conversely, when no pilot signal is included in the downward signal, the reference signal generated based on the output from the incorporated reference oscillation circuit 72 is used to frequency-convert the in-building upward signal to the upward signal for the external bi-directional CATV system. Moreover, in the down-converter 28, when no pilot signal is included in the downward signal, the pseudo pilot signal is generated instead of the pilot signal, and transmitted to the terminal side.

Figure 4:
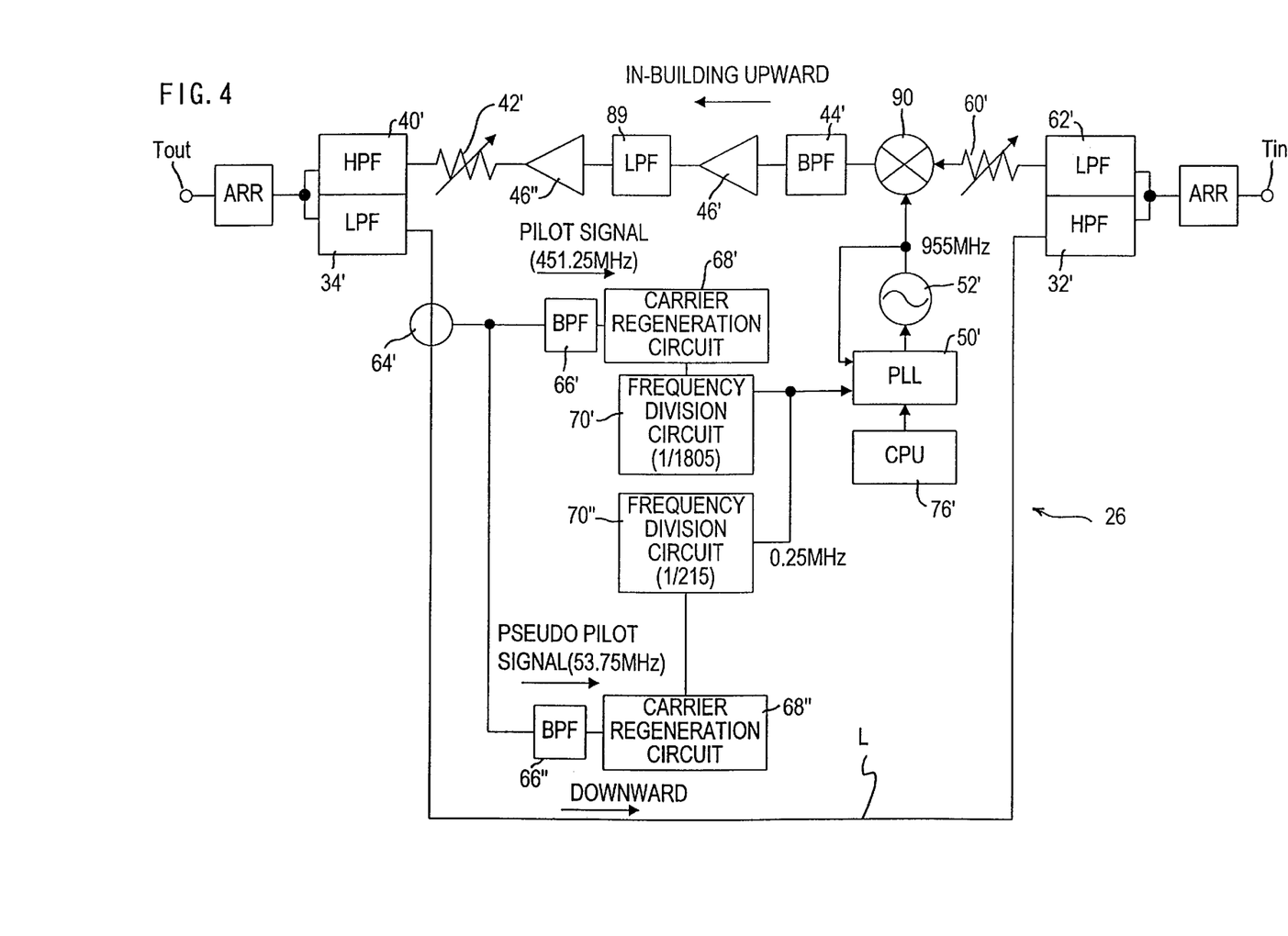
FIG. 4 is a block diagram showing the constitution of an up-converter.

On the other hand, the up-converter 26 as another main part of the present invention is constituted as shown in FIG. 4. Additionally, in FIG. 4, the constituting elements having the same functions as those of the constituting elements of the down-converter 28 are shown with the same numerals with "'" or "''" attached thereto.

As shown in FIG. 4, the up-converter 26 is provided with a first terminal Tin as an input terminal for inputting an upward signal from the cable modem 24, and a second terminal Tout as an output terminal for outputting the frequency-converted in-building upward signal toward the terminal 20.

Moreover, the downward signal inputted to the second terminal Tout via the transmission line 12 is once taken into the up-converter 26 via an LPF 34' with a cutoff frequency, for example, of 860 MHz for cutting off the in-building upward signal and passing the downward signal, and inputted to an internal downward signal path L. Furthermore, the downward signal passed through the downward signal path L is outputted to the terminal side from the first terminal Tin via an HPF 32' with cutoff frequency, for example, of 54 MHz for cutting off the upward signal and passing the downward signal.

The upward signal inputted to the first terminal Tin from the terminal side is taken into the up-converter 26 via an LPF 62' with a cutoff frequency, for example, of 42 MHz for cutting off the downward signal and passing the upward signal. The introduced upward signal is inputted to a mixer 90 via an attenuator 60' for attenuating the upward signal, and frequency-converted to the in-building upward signal using the signal of 955 MHz from a local oscillation circuit 52' in the mixer 90.

Additionally, the mixer 90 receives the signal, with the oscillation frequency controlled by a PLL circuit 50' to be constant at 955 MHz, from the local oscillation circuit 52', and frequency-converts the upward signal to the in-building upward signal.

Moreover, the frequency-converted in-building upward signal is transmitted to an HPF 40' with a cutoff frequency, for example, of 913 MHz for cutting off the downward signal and passing the in-building upward signal, via a BPF 44' with a passing band, for example, of 913 to 950 MHz for passing only the in-building upward signal, an amplification circuit 46' for amplifying the in-building upward signal, an LPF 89 with a cutoff frequency, for example, of 950 MHz for passing the in-building upward signal, an amplification circuit 46" for amplifying the in-building upward signal, and an attenuator 42' for attenuating the in-building upward signal, and outputted toward the transmission line 12 from the HPF 40' via the second terminal Tout.

Furthermore, a directional coupler 64' for branching a part of the downward signal passed through the LPF 34' is disposed in the downward signal path L leading to the HPF 32' from the LPF 34', and the downward signal branched by this directional coupler 64' is inputted to a BPF 66' for passing the pilot signal.

Furthermore, the downward signal passed through the BPF 66', that is, the pilot signal is inputted to a carrier regeneration circuit 68', and the pilot signal carrier regenerated in the carrier regeneration circuit 68' is inputted to a frequency division circuit 70', which divides the frequency of the carrier to provide a 1/1805 period and generates the reference signal of a predetermined frequency of 0.25 MHz. The reference signal generated in the frequency division circuit 70' is inputted to the PLL circuit 50.

On the other hand, in the present embodiment, when there is no pilot signal, the down-converter 28 generates a pseudo pilot signal with a frequency different from that of the pilot signal, and transmits the pseudo pilot signal to the terminal side. Therefore, the up-converter 26 is provided with a circuit which can generate the reference signal to be inputted to the PLL circuit 50' even from the pseudo pilot signal.

Specifically, the up-converter 26 is provided with a BPF 66" for passing the pseudo pilot signal among the downward signals branched by the directional coupler 64', a carrier regeneration circuit 68" for regenerating the carrier from the pseudo pilot signal passed through the BPF 66", and a frequency division circuit 70" for dividing the frequency of the regenerated pseudo pilot signal carrier to provide a 1/215 period and generating the reference signal with a predetermined frequency of 0.25 MHz. Moreover, the reference signal generated in this frequency division circuit 70" is also inputted to the PLL circuit 50'. Additionally, the up-converter 26 is provided with a CPU 76' for setting the oscillation frequency of the local oscillation circuit 52' controlled by the PLL circuit 50' in the same manner as the down-converter 28.

Therefore, in the up-converter 26 of the present embodiment, the upward signal can accurately be frequency-converted to the in-building upward signal based on the pilot signal inputted as one of downward signals from the external bi-directional CATV system, or the pseudo pilot signal generated in the down-converter 28.

Additionally, in order to protect the internal circuit from an abnormal high voltage inputted from the terminal side or from the in-building CATV system side by thunderbolt, the up-converter 26 of the present embodiment is provided with arrestors ARR on a signal path leading to the HPF 32' and LPF 62' from the first terminal of input terminal Tin and on a signal path leading to the HPF 40' and LPF 34' from the second terminal or output terminal Tout.

As described above, in the up-converter 26 of the present embodiment, there are provided:

(1) the LPF 62' for cutting off the downward signal and passing the upward signal on the signal path to input the upward signal inputted to the first terminal Tin to the upward signal path provided with the mixer 90 as the frequency converter;

(2) the HPF 40' for cutting off the downward signal and passing the in-building upward signal on the signal path to output the in-building upward signal frequency-converted in the mixer 90 as the frequency converter to the side of the second terminal Tout;

(3) the LPF 34' for cutting off the in-building upward signal and passing the downward signal on the signal path to input the downward signal inputted to the second terminal Tout to the downward signal path L; and (4) the HPF 32' for cutting off the upward signal and passing the downward signal on the signal path to output the downward signal passed through the downward signal path L to the side of the first terminal Tin.

Therefore, only the in-building upward signal frequency-converted by the frequency converter constituted of the local oscillation circuit 52' and the mixer 90 is outputted on the transmission line 12 of the in-building CATV system from the up-converter 26 of the present embodiment. The upward signal before the frequency conversion is prevented from being outputted onto the transmission line 12 of the in-building CATV system and from adversely affecting the operation of the other transmission apparatuses such as the bi-directional amplifier 16 disposed on the transmission line 12.

Moreover, since the up-converter 26 of the present embodiment uses the LPF or the HPF to separate the signals without using the distribution circuit, the signal transmission losses in the up-converter can be reduced.

As described above, in the down-converter 28 of the present embodiment, there are provided:

(1) the HPF 40 for cutting off the input of the downward signal passed through the downward signal path L and selectively passing the in-building upward signal on the signal path to input the in-building upward signal inputted to the internal connection terminal T3 to the frequency converter constituted of the mixer 48 and the local oscillation circuit 52;

(2) the LPF 62 for cutting off the downward signal inputted to the external connection terminal T1 from the outside and selectively passing only the upward signal on the signal path to output the upward signal frequency-converted in the frequency converter constituted of the mixer 48, the local oscillation circuit 52, and the like to the external connection terminal T1;

(3) the HPF 32, between the external connection terminal T1 and the downward signal path L, for preventing the frequency-converted upward signal from turning to the downward signal path L and selectively passing only the downward signal inputted to the external connection terminal T1 from the outside; and (4) the LPF 34 for cutting off the in-building upward signal inputted from the internal connection terminal T3 and selectively passing only the downward signal on the signal path leading to the internal connection terminal T3 from the downward signal path L.

As a result, the downward signal is outputted to the in-building transmission line 12 from the down-converter 28 of the present embodiment, and only the upward signal with the frequency for the external bi-directional CATV system is outputted to the transmission line 2 of the external bi-directional CATV system. This can prevent the in-building upward signal from being outputted to the external bi-directional CATV system and from adversely affecting the operation of the transmission apparatuses such as the bi-directional amplifier disposed on the transmission line 2.

One embodiment of the present invention has been described above, but the present invention is not limited to the above-described embodiment, and can variously be embodied.

For example, according to the above-described embodiment, in the up-converter 26, the pilot signal superposed onto the downward signal and the pseudo pilot signal are selectively used to frequency-convert the upward signal. However, in the in-building CATV system provided with the down-converter which cannot generate the pseudo pilot signal, the pilot signal may be used to frequency-convert the upward signal, or the reference signal for the frequency conversion may be generated simply by the local oscillation circuit 52'.

Furthermore, in the above-described embodiment, the down-converter 28 utilizes the pilot signal in the external bi-directional CATV system to frequency-convert the in-building upward signal to the upward signal. When the pilot signal cannot be received, the pseudo pilot signal for the frequency conversion is generated, and additionally the pseudo pilot signal is outputted to the side of the up-converter 26. However, simply the output from the local oscillation circuit 52 may be used as the reference signal for the frequency conversion, and outputted to the side of the up-converter 26. Alternatively, when the up-converter 26 is constituted to use the output from the self local oscillation circuit 52' as the reference signal and to perform the frequency conversion, no reference signal for the frequency conversion may be outputted to the side of the up-converter 26.

What is claimed is:

1. An up-converter for an in-building CATV system, disposed between an terminal and a terminal unit on a subscriber side for frequency-converting an upward signal inputted from the terminal unit to an in-building upward signal, in the in-building CATV system in which a lead-in wire from an external bi-directional CATV system is led into a building, a downward signal of said bi-directional CATV system inputted via said lead-in wire is transmitted to the terminal via a transmission line in the building, the in-building upward signal inputted from the terminal and having a frequency higher than a transmission frequency in said bi-directional CATV system is transmitted to said lead-in wire via said transmission line, and the in-building upward signal is converted to provide the transmission frequency in said bi-directional CATV system by a down-converter disposed between said lead-in wire and said transmission line, and outputted to the side of said bi-directional CATV system, said up-converter comprising:

a first terminal connected to the side of said terminal unit;

a second terminal connected to the side of said terminal;

a frequency converter for frequency-converting the upward signal inputted from the side of said terminal unit via said first terminal to said in-building upward signal and outputting the in-building upward signal to the side of said second terminal;

a downward signal path for transmitting the downward signal inputted from said second terminal to said first terminal;

a low-pass filter disposed between said first terminal and said frequency converter for cutting off the input of the downward signal passed through said downward signal path and selectively passing the upward signal from the side of said terminal unit;

a high-pass filter disposed between said frequency converter and said second terminal for cutting off the downward signal inputted from the second terminal and selectively passing the in-building upward signal outputted from said frequency converter;

a low-pass filter disposed between said second terminal and said downward signal path for cutting off the input of the in-building upward signal outputted from said frequency converter and selectively passing the downward signal inputted from said second terminal; and a high-pass filter disposed between said downward signal path and said first terminal for cutting off the upward signal inputted from the first terminal and selectively passing said downward signal.

2. The up-converter for the in-building CATV system according to claim 1 wherein:

said frequency converter is constituted to use a reference signal with a predetermined frequency superposed to said downward signal and to frequency-convert said upward signal to the in-building upward signal, and said downward signal path is provided with a branch circuit for branching a part of the downward signal inputted from said second terminal via said low-pass filter and inputting the part to said frequency converter.

3. A down-converter for an in-building CATV system disposed between a lead-in wire and a transmission line in a building for converting an in-building upward signal to an upward signal which has a frequency lower than that of a downward signal and suitable for a transmission frequency in an external bi-directional CATV system and outputting the upward signal to said lead-in wire, in the in-building CATV system in which the lead-in wire from the external bi-directional CATV system is led into the building, the downward signal inputted from said lead-in wire is transmitted to an terminal in the building via the transmission line in the building, and the in-building upward signal inputted to the terminal via an up-converter and having the frequency higher than the frequency of said downward signal is transmitted to said lead-in wire, said down-converter comprising:

an external connection terminal connected to said lead-in wire;

an internal connection terminal connected to the transmission line in said building;

a downward signal path for outputting the downward signal inputted from the side of said external connection terminal to the side of said internal connection terminal;

a frequency converter for frequency-converting the in-building upward signal inputted from the side of the internal connection terminal to the upward signal for said bi-directional CATV system and outputting the upward signal to the side of said external connection terminal;

a high-pass filter disposed between said internal connection terminal and said frequency converter for cutting off the input of the downward signal passed through said downward signal path and selectively passing said in-building upward signal;

a low-pass filter disposed between said frequency converter and said external connection terminal for cutting off the downward signal inputted from the external connection terminal and selectively passing the upward signal outputted from said frequency converter;

a high-pass filter disposed between said external connection terminal and said downward signal path for cutting off the input of the upward signal outputted from said frequency converter and selectively passing the downward signal inputted from said external connection terminal; and a low-pass filter disposed between said downward signal path and said internal connection terminal for cutting off the in-building upward signal inputted from the internal connection terminal and selectively passing said downward signal.

* * * * *